May 16, 1933.　　A. M. JOHNSON ET AL　　1,909,767
MACHINE TOOL
Filed April 13, 1929　　5 Sheets-Sheet 1
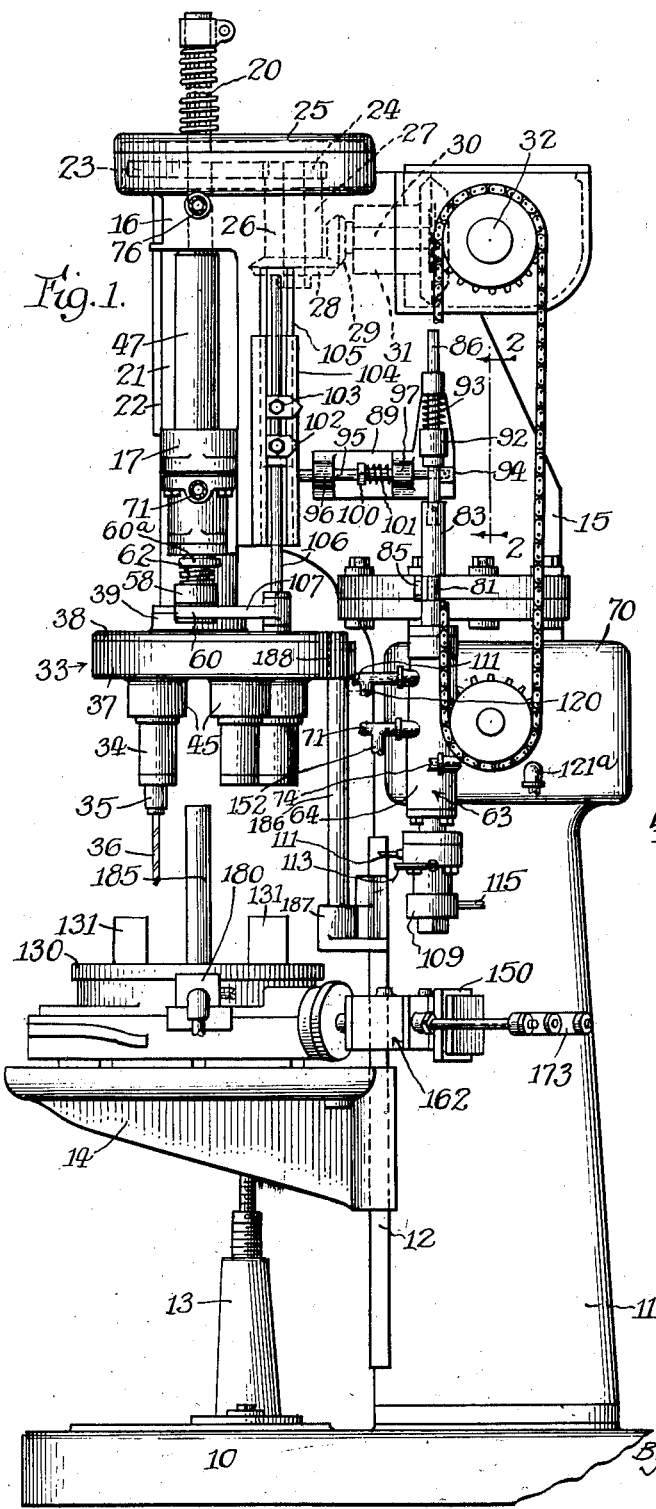
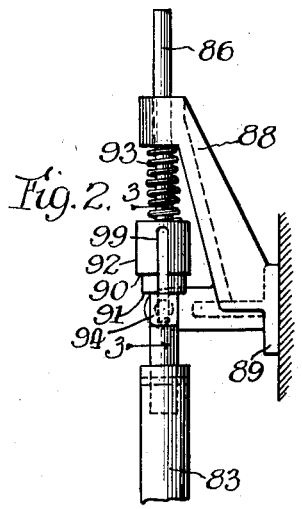
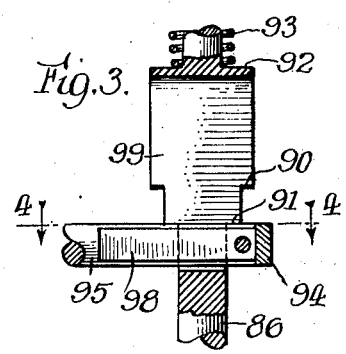
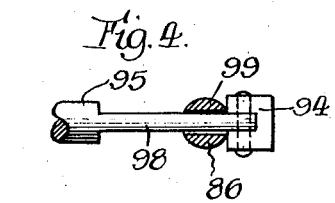
Inventors:
Albert M. Johnson,
Walter M. Fairbairn,
Attys.

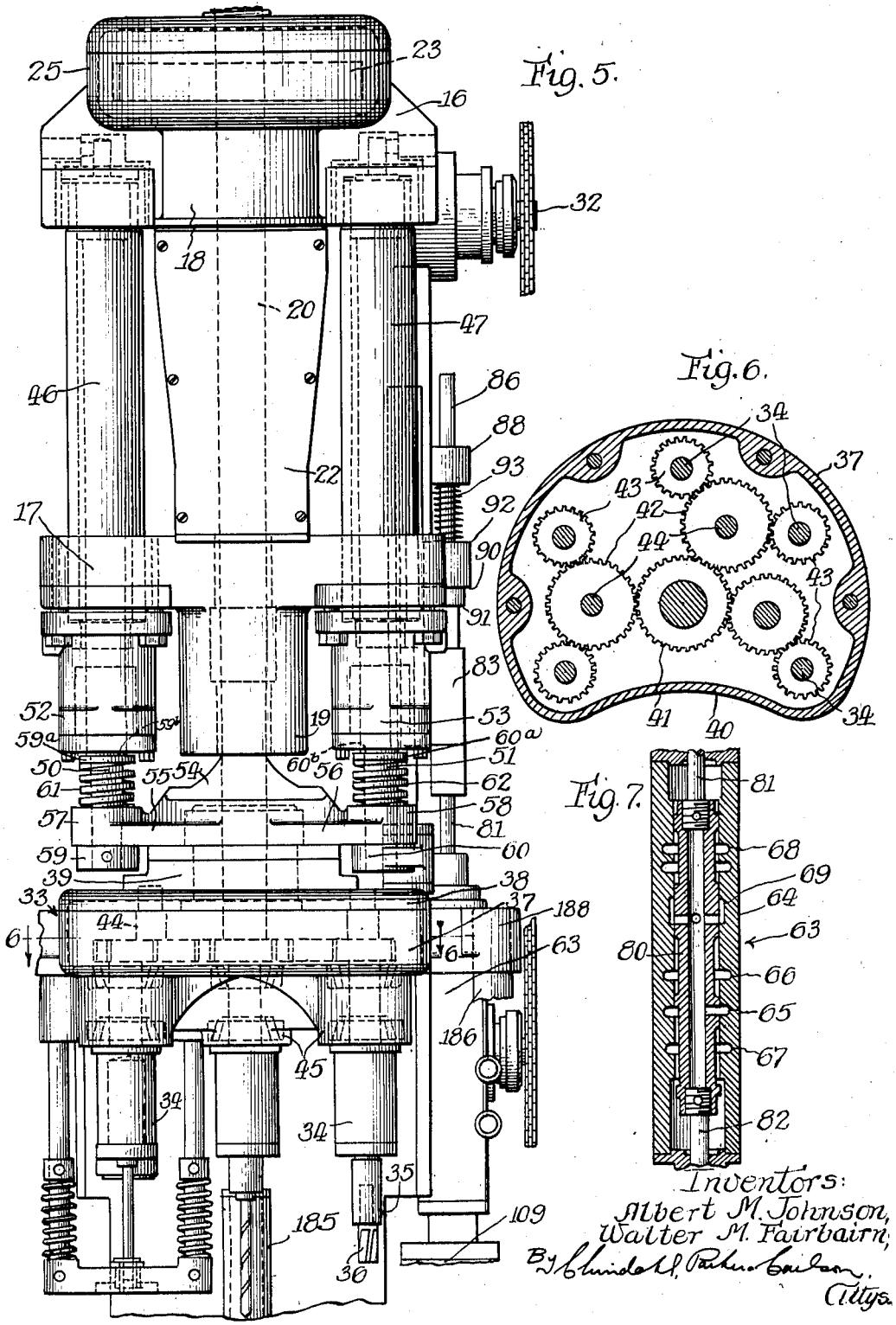

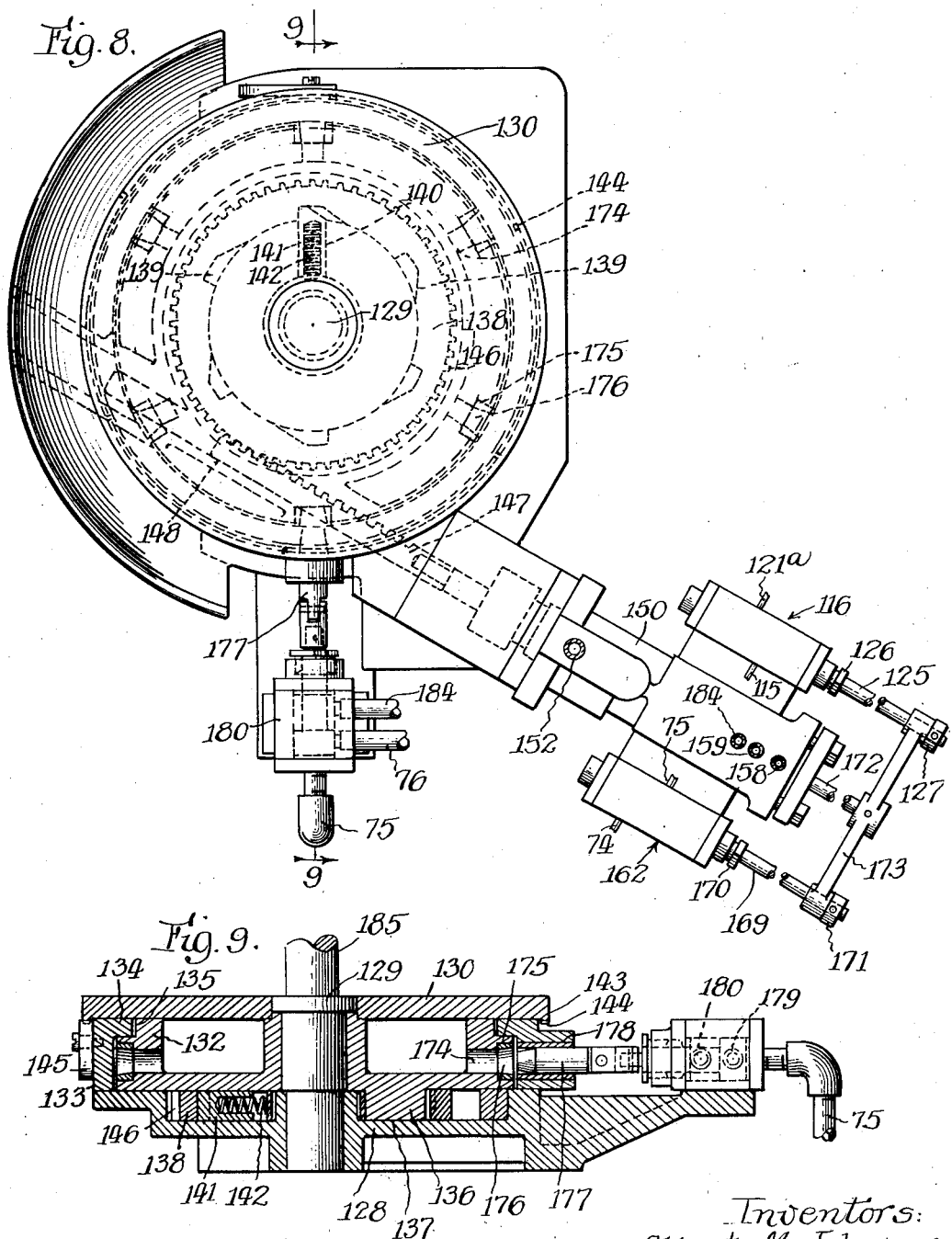

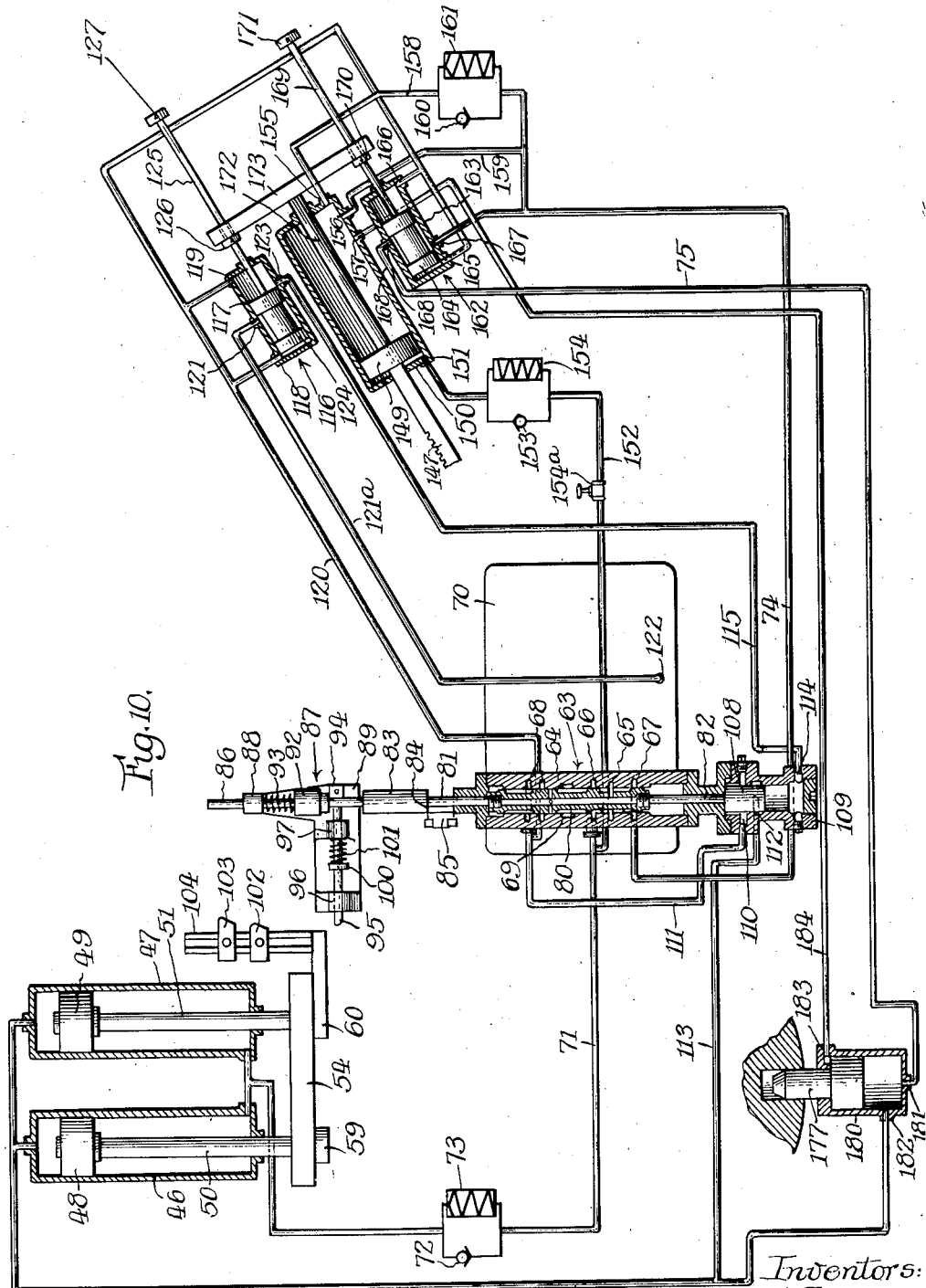

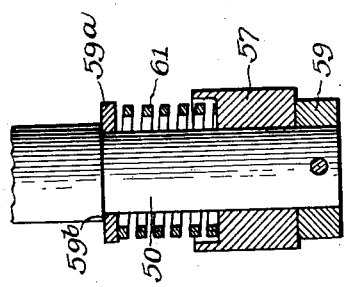
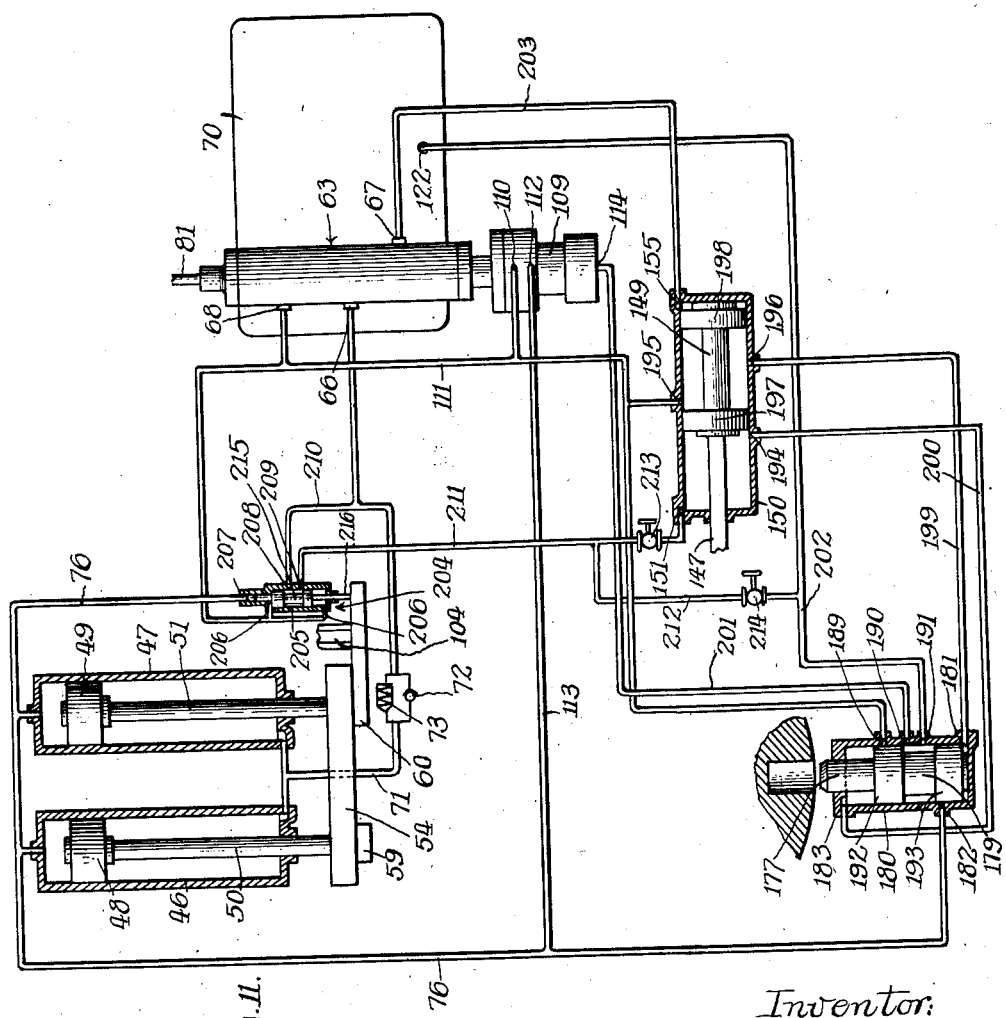

Patented May 16, 1933

1,909,767

UNITED STATES PATENT OFFICE

ALBERT M. JOHNSON AND WALTER M. FAIRBAIRN, OF ROCKFORD, ILLINOIS, ASSIGNORS TO BARNES DRILL COMPANY, OF ROCKFORD, ILLINOIS, A CORPORATION OF ILLINOIS

MACHINE TOOL

Application filed April 13, 1929. Serial No. 354,769.

The present invention relates to improvements in machine tools adapted for such operations as drilling and tapping, and in its specific application has reference to a new and improved automatic drilling machine.

One object of the invention is to provide a machine tool of a practicable character having an hydraulically actuated reciprocatory head and an hydraulically actuated indexing mechanism with improved means for controlling the operation of the head and the work support so as to insure their operation in proper timed relation.

Another object resides in the provision of hydraulic means for indexing the work support, and a hydraulic control interconnecting the cyclic movement of the drill head and the indexing movement of the support so as to prevent the institution of the quick-approach until the indexing operation has been completed, etc.

A general object is to provide a new and improved automatic drilling machine which is expeditious, efficient and fool proof in operation, and which is relatively simple and compact in construction.

Further objects and advantages will become apparent as the description proceeds.

In the accompanying drawings, Fig. 1 is a side elevation of a drilling machine embodying the features of our invention.

Fig. 2 is a fragmentary detail view of the trip mechanism for controlling the cyclic movements of the drill head, the view being taken along line 2—2 of Fig. 1.

Fig. 3 is a fragmentary sectional view taken along line 3—3 of Fig. 2.

Fig. 4 is a fragmentary sectional view taken along line 4—4 of Fig. 3.

Fig. 5 is a fragmentary front elevation, on an enlarged scale of the machine.

Fig. 6 is a sectional view taken along line 6—6 of Fig. 5.

Fig. 7 is an enlarged sectional view of the main control valve.

Fig. 8 is a plan view of the work support.

Fig. 9 is a sectional view taken along line 9—9 of Fig. 8.

Fig. 10 is a diagrammatic representation of the hydraulic operating mechanism and hydraulic control.

Fig. 11 is a diagrammatic representation of a modified form of the hydraulic control.

Fig. 12 is a fragmentary detail view of the mounting for the tool head on one of the piston rods.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring more particularly to the drawings, the machine constituting the exemplary embodiment of the invention comprises a base 10 having an upstanding column or pedestal 11. Mounted on ways 12 on the front of the column 11 and supported by a suitable jack screw 13 is a work carriage 14. Rigidly mounted on the top of the column 11 is a head casing 15 having upper and lower projections 16 and 17 extending forwardly over the work carriage 14. The upper and lower extensions 16 and 17 are formed respectively with a central guide bearing 18 and a central depending guide bearing 19 in which a main drive spindle 20 is suitably disposed for rotation and vertical reciprocation. Enclosing the spindle 20 between the bearings 18 and 19 is a housing 21 having a removable front cover plate 22.

Any suitable means may be provided for rotating the drive spindle 20. In the present instance, this means comprises a gear 23 splined to the upper end of the spindle 20, and meshing with a gear 24. The gears 23 and 24 are enclosed in a suitable housing 25 on the upper projection 16. The gear 24 is keyed to a stub shaft 26 journaled in a bearing 27 in the casing 15, and connected through bevel gears 28 and 29 to a stub shaft 30. The shaft 30 is journaled in a bearing 31 in the casing 15, and is adapted to be connected through a clutch (not shown) to a drive shaft 32 in turn adapted to be connected to a suitable source of power (not shown).

The lower end of the spindle 20 is connected operatively to a drill head 33 having a plurality of tool spindles 34 each of which is provided with a suitable chuck 35 for a tool, such as a drill 36. While any desired number of tool spindles 34 may be provided, in the present instance we have shown five such spindles arranged in five or six equally spaced positions about the drive spindle 20.

Preferably, the drill head 33 comprises a gear casing 37 having a removable top cover plate 38 with a central hub 39. The casing 37 is generally circular in shape, the only departure therefrom being a gradual indentation in the peripheral wall indicated at 40, this indentation being at the sixth or unoccupied position with reference to the tool spindles 34. The indentation 40 provides a space facilitating the removal of the finished work piece from the carriage 14, and permits reloading during the machine operation thereby saving considerable time. The lower end of the spindle 20 extends through the hub 39 into the casing 37, and is provided with a gear 41 therein. This gear 41 is connected through three intermediate gears 42 with five gears 43 secured respectively to the inner ends of the tool spindles 34. The gears 42 are mounted on stub shafts 44 suitably journaled in the casing 37. The tool spindle 34 are journaled in depending bearing sleeves 45 on the bottom wall of the casing 37.

Suitable means is provided for reciprocating the drill head 33 automatically relative to the work support. This means comprises a pair of piston and cylinder units mounted on the head casing 15 respectively at opposite sides of the drive spindle 20. These units are identical in construction, and comprise two vertically disposed cylinders 46 and 47 securely anchored at opposite ends in opposite sides of the forward projections 16 and 17 of the head casing 15. A pair of pistons 48 and 49 are slidably disposed in the cylinders 46 and 47, and are mounted on the upper ends of two piston rods 50 and 51 extending out of the lower ends of the cylinders. Suitable stuffing boxes 52 and 53, one for each of the piston rods 50 and 51, are secured to the lower ends of the cylinders.

The piston rods 50 and 51 support a cross head 54 to which the hub 39 of the drill head 33 is securely connected. To this end, the cross head 54 encircles the drive spindle 20, and is formed with laterally extending arms 55 and 56 having collars 57 and 58 on their free ends slidably mounted on the piston rods 50 and 51. A pair of collars 59 and 60 are secured respectively to the free ends of the piston rods 50 and 51, and underlie the collars 57 and 58. A second pair of collars 59$^a$ and 60$^a$ are disposed on the rods above the collars 57 and 58 and in spaced relation thereto, and normally abut against downwardly facing shoulders 59$^b$ and 60$^b$ formed on the rods. Disposed on the piston rods 50 and 51 in end abutting engagement with the thrust collars 59$^a$ and 60$^a$ and the collars 57 and 58 are a pair of coil springs 61 and 62. These springs serve to permit a limited independent downward movement of the piston rods 50 and 51 after the drill head 33 has come to a positive stop.

The driving mechanism for the drill head 33 constitutes an important feature of the present invention. The double piston and cylinder construction provides strength, rigidity, a balanced application of power, and accurate alignment. Chattering and vibration are substantially eliminated. If desired, vertical guide means may be provided for the head 33 at opposite sides thereof to provide greater rigidity and resistance to torque, particularly when the head is working in its lower position. Preferably, this guide means comprises vertical guides or sliding members 186 mounted on the front of the column 11 and at opposite sides thereof, as by means of a cross bracket 187. The guides 186 may extend through laterally extending bosses or arms 188 on opposite sides of the head 33. The yielding connection between the drill head 33 and the piston rods 50 and 51 provides a cushioning effect, permits an accurate cut to the desired depth, and provides a dwell period at the end of the feeding movement after which the quick return can be instituted. This dwell permits the tools to rotate idly in the work so as to produce a smooth finish.

Suitable means is provided for supplying pressure fluid, such as oil, selectively to opposite ends of the cylinders 46 and 47. This means comprises a main control valve 63 having a cylindrical casing 64 formed with an inlet port 65, outlet ports 66 and 67, and exhaust ports 68 and 69. The inlet port 65 and the exhaust port 69 are connected to an oil pump 70 which is adapted to deliver a constant volume of oil, and which is adjustable to vary this volume so as to vary the general speed of the machine. The specific construction of the pump 70 is not shown since pumps of this kind are old and well known, and since the pump 70 per se therefore forms no part of the present invention. The outlet port 66 is connected through a line 71 to the lower ends of the cylinders 46 and 47. Interposed in parallel in the line 71 are a check valve 72 for permitting the free passage of fluid to the cylinders 46 and 47, and a foot valve 73 set to open at a desired pressure, for example 100 pounds per square inch, for permitting fluid to exhaust from the cylinders. The outlet port 67 is connected to a line 74 which is adapted to be connected through lines 75 and 76 to the upper ends of the cylinders 46 and 47.

Slidably disposed in the casing 64 is a suitable valve plunger 80 adapted to be positioned in four different vertical positions. The plunger 80 is so constructed that in its uppermost position, both outlet ports 66 and 67 are connected to the inlet port 65, in its next position, the port 67 is connected to the inlet port 65 and the port 66 is connected to the exhaust port 69, in its next position, the ports 66 and 67 are connected to the exhaust port 69, and in its lowermost position, the port 66 is connected to the inlet port 65 and the port 67 is connected to the exhaust port 69. For convenience, these positions may be designated as the quick-approach position, the feed position, the neutral position, and the quick-return position. In the quick-approach position, the constant volume of pressure fluid is effective against the differential area on top of each piston, and since this area is small, the downward movement of the pistons will be rapid. In the feed position, the same volume of pressure fluid will be effective only against the relatively large top areas of the pistons 48 and 49, and hence the continued downward movement will be slow. In the quick-return position, the same volume of pressure fluid will be effective only against the relatively small bottom areas of the pistons.

Suitable means is provided for automatically controlling the position of the valve plunger 80. To this end, the plunger 80 is provided with upper and lower valve stems 81 and 82 projecting axially out of the casing 64. The upper end of the stem 81 is provided with a tubular enlargement 83, the lower end of which defines an annular shoulder 84. A lock arm or wing 85 is pivotally mounted on the casing 15 for movement into and out of the path of the shoulder 84. If the arm 85 is swung into the path of the shoulder 84, it will prevent the plunger 80 from dropping past its neutral position.

Secured to the upper end of the enlargement 83 in alignment therewith is a pull rod 86 which forms part of a trip mechanism 87 (see Figs. 1 to 4). The upper end of the rod 86 extends slidably through a guide arm 88 formed integral with a bracket 89 secured to the side of the head casing 15. The rod 86 is provided intermediate its ends with two vertically spaced downwardly facing shoulders or abutments 90 and 91. Preferably, these abutments are defined by an enlargement 92 on the rod 86, the lower end of the enlargement being reduced in size so that the upper abutment 90 is substantially larger than the lower abutment 91. A coil spring 93 is disposed on the rod 86 in abutting engagement with the arm 88 and the enlargement 92, and tends to urge the rod downwardly.

To latch the pull rod 86 releasably in either of its two upper positions, a trip block 94 is suitably mounted for selective engagement with the abutments 90 and 91. In the present instance, the trip block 94 is secured to the rear end of a sectioned trip rod 95 slidably mounted in two spaced horizontally aligned lugs 96 and 97 on the bracket 89. Preferably, the rear end of the rod 95 is flattened as indicated at 98, and the flattened portion is slidable in a diametrical longitudinal slot 99 formed in rod 86 from a point substantially below the lower abutment 91 almost to the top of the enlargement 92. The rod 95 is provided with a collar 100 between the lugs 96 and 97. A coil spring 101 is disposed on the rod 95 between the lug 97 and the collar 100, and tends to urge the block 94 forwardly into engagement with the rod 86.

The front end of the trip rod 95 projects into the path of a feed dog 102 and a reversing dog 103 mounted for movement with the drill head 33. In the present instance, the dogs 102 and 103 are adjustably mounted in vertically spaced relation on a control bar 104 slidably mounted in a vertical guideway 105 on the side of the head casing 15. The lower end of the control bar 104 is secured to a rod 106 connected to an arm 107 formed integral with the collar 60 on the piston rod 51. The feed dog 102 is shorter than the reversing dog 103 so that in the downward movement of the drill head 33 from its uppermost position, first the dog 102 will engage the rod 95 to move the block 94 out of engagement with the abutment 91 but not out of the path of the abutment 90, thereby permitting the plunger 80 to drop to its feed position, and then the dog 103 will engage the rod 95 to move the block out of engagement with the abutment 90, thereby permitting the plunger to drop through its neutral position to its quick-return position.

Suitable means is provided for automatically raising the plunger 80 against the force of the spring 101 into its quick-approach position in which it will be latched automatically by the block 94. This means comprises a piston 108 secured to the valve stem 82 and slidably disposed in a cylinder 109 at the lower end of the valve casing 64. The cylinder 109 is formed with an exhaust port 110 connected by a line 111 to the exhaust port 68 of the valve casing 64, a second exhaust port 112 connected by a line 113 to the line 76 leading to the upper ends of the cylinders 46 and 47, and an inlet port 114 in the lower end connected by a line 115 to a pilot valve 116. The exhaust port 110 is always open, but the exhaust port 112 is closed by the piston 108 except when the plunger 80 is in its quick-return position.

The pilot valve 116 comprises a casing 117 having end exhaust ports 118 and 119 connected by a common exhaust line 120 to the exhaust port 68 of the valve casing 64, an intermediate inlet port 121 connected by a line 121ª to an auxiliary source of low pressure fluid 122, and an outlet port 123 connected to the line 115. A valve plunger 124 is slidably disposed in the casing 117, and in its opposite positions is adapted to connect the port 123 alternately to the exhaust port 119 and the inlet port 121. The plunger 124 is provided with a stem 125 extending out of the rear end of the casing 117, and carrying two spaced abutment collars 126 and 127 for interlocking the operation of the valve 116 with the indexing mechanism as will be hereinafter described.

The work carriage 14 in the present instance comprises a base 128. Pivotally mounted on a stud 129 on the base 128 is a horizontal rotary work table 130 adapted to support a plurality of individual work holders 131. In the present instance, six work holders equally spaced about the path of movement of the work spindle and in alignment with the tool spindles 34 are provided. The table 130 is provided with a concentric annular drum or wall 132 on its lower surface rotatable within an upstanding circumferential wall 133 on the base 128. An inner peripheral retaining flange 134 on the upper end of the wall 133 engages an outer peripheral notch 135 in the upper end of the wall 132 to retain the latter in position.

Means is provided for automatically indexing the work table 130 so as to present the work blanks successively to different drills or tools in successive positions of the table. By this arrangement, after the work has been acted on by each of the five tools, it will be indexed into the free position at the front of the base for removal and replacement. To this end, the table 130 is formed with an annular depending hub flange 136 rotatable in a depression 137 in the top of the base 128. A ratchet 138 in the form of a ring is rotatable on the hub flange 136, and is formed with a plurality of ratchet notches 139, one for each work position, in its inner peripheral surface. Slidably disposed in a radial opening 140 in the hub flange 136 is a tooth detent 141 urged outwardly by a spring 142. The detent 141 is adapted to engage the ratchet notches 139 selectively for the purpose of transmitting rotation of the ratchet 138 in one direction to the table 130, but is ineffectual to effect rotation of the table in the opposite direction. To prevent back lash or drag when the ratchet 138 moves over the detent 141, the table 130 is formed with a depending peripheral flange 143 outside of the base wall 133. The flange 143 is formed with ratchet teeth 144 on its end surface in engagement with a gravity pawl 145 pivoted on the wall 133. To rotate the ratchet 138 periodically in opposite directions so as to index the table 130, the ratchet is formed on its outer periphery with gear teeth 146 in mesh with a gear rack bar 147 reciprocable in a guideway 148 in the base 128.

The rack bar 147 extends out of the base 128, and is operatively connected to an indexing piston 149 slidably disposed in a cylinder 150 mounted on the carriage 14. For convenience, the movement of the rack bar 147 into the cylinder 150 is designated as the preparatory stroke, and the reverse movement is designated as the indexing stroke. The front end of the cylinder 150 is provided with a port 151 connected by a line 152 to the port 66 of the main valve casing 64. Interposed in the line 152, in parallel, are a check valve 153 for permitting a free exhaust from the port 151, and a foot valve 154 set to open at a desired pressure, for example 500 pounds per square inch, for supplying fluid to the port 151. Also interposed in the line 152 is a hand valve 154ª for cutting out the indexing mechanism to stop the drill head 33 in its uppermost position. The rear end of the cylinder 150 is provided with an end port 155, and two ports 156 and 157 spaced longitudinally of the cylinder, and adapted to be controlled by the piston 149. The ports 155 and 156 are connected respectively by branch lines 158 and 159 to the line 74. Interposed in parallel in the line 158 are a check valve 160 for permitting a free flow of fluid to the cylinder 150, and a foot valve 161 for permitting a flow from the cylinder when the pressure acting thereon exceeds a predetermined pressure, for example 125 pounds per square inch.

Interposed between the lines 74 and 75 is a cut-off valve 162 comprising a casing 163 and a plunger 164 reciprocable therein. The casing 163 has end exhaust ports 165 and 166 connected to the exhaust line 120, and ports 167 and 168 connected respectively to the lines 74 and 75. The ports 167 and 168 are so positioned that the plunger 164 in its movement into opposite positions is adapted to connect the line 75 alternately to the line 74, and the exhaust line 120. The plunger 164 is provided with a stem 169 extending rearwardly from the casing 163 and carrying spaced abutment collars 170 and 171.

The indexing piston 149 is provided with a rod 172 extending rearwardly from the cylinder 150. Secured to the outer end of the rod 172 is a cross head 173 which is slidable on the stems 125 and 169 between the collars 126 and 127, and 170 and 171. Hence, near the end of the preparatory stroke, the piston 149 actuates the plungers 124 and 164 rearwardly respectively to direct pressure fluid to the bottom of the cylinder 109 so as to raise the valve plunger 80 into its quick-approach position, and to break the connection to the line 75 so as to prevent pressure fluid from passing to the upper ends of the cylinders 46 and 47. Near the end of the indexing stroke, the piston 149 actuates the plungers 124 and 164 forwardly respectively to connect the bottom of the cylinder 109 to the exhaust and to connect lines 74 and 75.

Means is provided for accurately locating the work table 130 after each indexing movement, and for locking the table in position until the succeeding indexing movement is instituted. To this end, the wall 132 is formed with a plurality of openings 174 corresponding in number and relative spacing to the ratchet notches 139. Inserted in the outer end of each opening 174 is a bushing 175 having a flared recess or seat 176. A lock plunger 177 is slidably mounted in a bearing sleeve 178 in the wall 133 for selective engagement in the recesses 176. The outer end of the plunger 177 is operatively connected to a piston 179 slidably disposed in a cylinder 180 on the carriage 14. The cylinder 180 is interposed between the lines 75 and 76, and to this end has an outer end port 181 connected to the line 75, and an intermediate port 182 connected to the line 76 and adapted to be closed when the plunger 177 is withdrawn from the work table 130. The cylinder 180 also has an inner end port 183 connected by a line 184 to the port 157 of the indexing cylinder 150. The port 157 is uncovered by the piston 149 near the end of the preparatory stroke to bring it into communication with the line 152.

Extending upwardly from the stud 129 is a rod 185 adapted for engagement by the drill head 33 to limit the depth of the cut in the work. This engagement occurs shortly before the reversing dog 103 institutes the quick-return movement of the drill head 33.

The operation of the machine will now be described. To initiate the quick-approach movement of the drill head 33, the valve 63 must be in its uppermost position, and the plunger 177 must be in locking engagement with the work support 130. Under this condition, the movable units of the operating means are positioned as shown in Fig. 10. Pressure fluid is transmitted from the port 66 through the line 71 and the check valve 72 to the lower ends of the cylinders 46 and 47, and also from the port 67, through the line 74, the valve casing 163, the line 75, the cylinder 180 and the line 76 to the top ends of the cylinders. Since the constant volume of pressure fluid is supplied, and since the differential area of the pistons 48 and 49 is small, the drill head 33 will travel downwardly in a quick-approach movement.

When the drill head 33 reaches the end of its approach movement, the feed dog 102 trips the rod 86 to lower the valve plunger 80 into down-feed position. As a result, the port 66 is connected to the exhaust thereby causing the drill head 33 to continue its downward travel in a slow feed movement.

At the end of the feed movement, the head 33 abuts against the stem 185, and is brought thereby to a positive stop. The pistons 48 and 49, and the parts carried thereby, i. e., the collars 59, 60, 59ª and 60ª and the arm 107, continue the downward movement in the course of which the coil springs 61 and 62 are compressed. Thus, a dwell period is provided. Their additional downward movement continues for a short distance until the reversing dog 103 trips the rod 86 to drop the valve plunger 80 into its reverse or quick-return position in which the port 67 is connected to the exhaust through the cylinder 109, and the port 66 is open. Pressure fluid now is transmitted to the lower ends of the cylinders 46 and 47 to raise the drill head 33 in a quick-return movement.

At the end of the quick-return movement, the pistons 48 and 49 abut against the upper heads of the cylinders 46 and 47 to effect a positive stop. The pressure fluid soon builds up to 500 pounds, and then overflows through the line 152 and valve 154 to the indexing cylinder 150. Thereupon, the rack bar 147 moves inwardly in its preparatory stroke, the fluid from the rear end of the cylinder 150 first exhausting through the line 159, and finally through the line 158 and valve 161 to the line 74.

Near the end of the preparatory stroke, the port 157 is uncovered, thereby transmitting pressure fluid through the line 184 to the inner end of the cylinder 180. When the line 159 is closed subsequently, the resistance to the movement of the piston 149 is increased to 125 pounds, thereby causing the pressure at the port 157 to build up. Thereupon, the plunger 177 is withdrawn from the work support 130, and closes the post 182 connected to the upper ends of the cylinders 46 and 47. This permits the port 168 to open later without actuating the drill head 33.

Near the end of the preparatory stroke, the cross-head 173 actuates the plungers 124 and 164. The plunger 164 establishes a connection from the upper ends of the cylinders 46 and 47 through the line 76, the cylinder 180, the line 75, the casing 163 and the line 120 to the exhaust, and breaks the connection to the valve 63. Thereafter, the plunger 124 establishes a connection from the source of pressure fluid 122 through the line 121ª, the casing 117 and the line 115 to the lower end of the cylinder 109. The main valve plunger 80 now is raised into its uppermost position where it is automatically locked by the trip block 94. However, since the ports 168 and 182 are closed, the drill head 33 cannot travel downwardly.

Pressure fluid from the port 167 now is transmitted through the line 74, the line 158 and check valve 160 to the outer end of the cylinder 150 to move the rack bar 147 outwardly in its indexing stroke. The exhaust passes to the port 66.

Near the end of the indexing stroke the cross-head 173 again actuates the plungers 124 and 164. The plunger 124 breaks the connection from the cylinder 109 to the source 122, and connects the cylinder to the exhaust line 120. The plunger 164 establishes a connection between the line 75 and the line 74 to transmit pressure fluid to the outer end of the cylinder 180. This causes the plunger 177 to move into engagement with the work support 130. However, until the indexing is complete, and the plunger 177 is seated in one of the recesses 176, the port 182 remains closed. At the completion of the indexing movement, the plunger 177 moves into its innermost position, thereby opening the port 182 to establish a connection between the lines 75 and 76. Thereupon the quick-approach movement of the head 33 is instituted, and the foregoing cycle is repeated.

To stop the operation at the top of the stroke, the globe valve 154ª is closed when the head 33 is moving downwardly. This cuts off the connection to the indexing cylinder which controls the pilot valve 166 for raising the main valve plunger 80. To stop the operation at the bottom of the stroke, the arm 85 is moved into position under the shoulder 84. This prevents the valve plunger 80 from dropping through neutral into the reverse position.

In Fig. 11, we have shown a modified form of operating mechanism and control. Corresponding parts in these forms are identified by like reference characters. In this form, the cylinder 180 is formed with a plurality of intermediate ports 189, 190 and 191 and the piston 179 is formed with two spaced enlargements 192 and 193, the ports and enlargements being so spaced that in the locking position of the plunger 177, the ports 189 and 190 will be in communication while the port 191 will be closed, and in the other extreme position, the ports 190 and 191 will be in communication and the port 189 will be closed. The indexing cylinder 150 is formed with intermediate ports 194, 195 and 196, and the piston 149 is formed with spaced enlargements 197 and 198, the ports and enlargements being so spaced that shortly before the end of the indexing stroke, the ports 155 and 196 and the ports 194 and 195 are brought into communication, and at the end of the preparatory stroke the ports 151 and 194 and the ports 195 and 196 are brought into communication. The ports 189 and 195 are connected to the exhaust line 111. The ports 181 and 183 are connected respectively by lines 199 and 200 to the ports 194 and 196. The ports 190 and 191 of the cylinder 180 are connected respectively by lines 201 and 202 to the port 114 of the cylinder 109 and the source of low pressure fluid 122. The port 155 is connected by a line 203 to the main valve port 67.

A suitable valve 204 is provided for controlling the indexing operation. This valve comprises a casing 205 having end exhaust ports 206 connected to the line 111, having an upper end port 207 connected to the line 76, and having intermediate ports 208 and 209 connected respectively through lines 210 and 211 to the line 71 and the port 151. The line 211 is connected by a branch line 212 to the line 202. Suitable hand valves 213 and 214 are interposed respectively in the line 211 between the line 212 and the port 151 and in the line 212. Slidably disposed in the casing 205 is a valve plunger 215 having a depending stem 216 adapted to be engaged by the arm 60 movable with the cross head 54. The plunger 215 is adapted in its uppermost position to bring the ports 208 and 209 into communication, and in its other position to break said communication. It will be understood that the main valve 63 is controlled by the dog actuated trip mechanism just as in Fig. 10.

In the operation of the modified form, at the end of the quick return movement, the plunger 215 is raised, whereupon pressure fluid is directed from the port 66 through the line 71, the line 210, the ports 208 and 209, and the line 211 to the port 151. The piston 149 now is moved through its preparatory stroke. In the course of this movement, the ports 195 and 196 first are brought into communication to connect the outer end of the cylinder 180 to the exhaust line 111, and the ports 151 and 194 then are brought into communication to direct pressure fluid to the port 183 at the inner end of the cylinder 180. The lock plunger 177 now is moved out of engagement with the table 130, and in the course of this movement brings the ports 190 and 191 into communication, thereby causing pressure fluid from the source 122 to be directed to the port 114 of the cylinder 109. As a result, the main valve plunger 80 is returned to its quick approach position. Downward movement however is prevented since the ports 155 and 181 are closed.

Pressure fluid from the port 67 now is directed to the port 155, thereby instituting the indexing stroke. Near the end of the indexing stroke, the port 196 is opened to the port 155, and the port 194 is open to the exhaust port 195, thereby causing a return of the plunger to the work table 130 to lock the latter in position at the end of the indexing movement.

The port 182 now is open so that pressure fluid is directed to both ends of the cylinders 46 and 47 to institute the quick approach movement. Pressure fluid from the line 76 also returns the valve 204 to its inoperative position. The tool head 33 may be stopped in its uppermost position by closing the valve 213.

We claim as our invention:

1. A machine tool comprising, in combination, a base, a movable work support on said base, means for periodically indexing said support, a tool head reciprocable toward and from said support, hydraulic means for actuating said tool head, a main control valve for controlling the operation of said tool head and said indexing means, a pilot valve for controlling said main valve, said pilot valve being operable by said indexing means, and means controlled by said indexing means and interposed between said main valve and said hydraulic means for preventing operation of said tool head in one direction until the indexing has been completed.

2. A machine tool having a reciprocable head, a rotatable work support, an hydraulically actuated motor for reciprocating said head, indexing means for said support including a second hydraulically actuated motor, a locking device for said support operable automatically upon the completion of each indexing operation to hold the support against movement, a main control valve having approach and return positions, means under the joint control of said locking device when in its holding position and of said main valve when in its approach position to effect the advance of said head, means operable by said head at the end of its advance movement to move said main valve to its return position whereby to effect the return of said head to its initial position, means operable upon the movement of said head into such initial position to effect a preparatory movement of said indexing means by said second motor, means operable under the control of said indexing means as an incident to such preparatory operation thereof to disengage said locking device from the support and thereupon to move said main valve into its approach position, and means controlled by said main valve when in such approach position to actuate said second motor to index said support.

3. A machine tool having a reciprocable head, a rotatable work support, an hydraulically actuated motor for reciprocating said head, indexing means for said support including a second hydraulically actuated motor, a locking device for said support, a main control valve having approach and return positions, means under the joint control of said locking device when in its holding position and of said main valve when in its approach position to effect the advance of said head, means operable by said head at the end of its advance movement to move said main valve to its return position whereby to effect the return of said head to its initial position, means operable upon the movement of said head into such initial position to impart a preparatory movement to said indexing means, means operable under the control of said indexing means as an incident to such preparatory operation thereof to disengage said locking device from the support and thereupon to move said main valve into its approach position, means controlled by said main valve when in such approach position to actuate said second motor to index said support, and means controlled by said indexing means in its last mentioned operation to move said locking device into holding relation to the table.

4. A machine tool having a reciprocable head, a rotatable work support, means to index said support, a locking device for the support operable automatically upon the completion of each indexing operation to hold the support against movement, hydraulically actuated means connected to said head to reciprocate it, a main control valve adapted to determine the direction of movement of the head by said hydraulic means, fluid pressure actuated means controlled by the indexing means to shift said valve into position to cause advance movement of the head, and means controlled by said locking device when moved into engaging relation with said support adapted to coact with said main valve in effecting the advance of the head.

5. A machine tool having a reciprocable head, a rotatable work support, means to index said support, a locking device for the support operable automatically upon the completion of each movement of the support to hold it in position, an hydraulically actuated motor connected to said head to reciprocate it, means for delivering fluid pressure to said motor including a main control valve adapted to determine the direction of movement of the head by said motor, means operable under the control of said locking device when moved into disengaged relation to the support to condition said main valve for the advance movement of the head, and means operable upon the movement of the locking device into holding relation to said support to render said valve effective to cause the motor to advance the head.

6. A machine tool having a reciprocable head, a work support, an hydraulically actuated motor for reciprocating said head, indexing means for said support including a second hydraulically actuated motor, a locking device for said support operable automatically upon the completion of each indexing operation to hold the support against movement, a main control valve having approach and return position, means under the joint control of said locking device when in its holding position and of said main valve when in its approach position to effect the advance of said head, means operable by said head at the end of its advance movement to move said main valve to its return position whereby to effect the return of said head to its initial position, valve means actuated by said head in its movement into such initial position to effect a preparatory movement of said indexing means by said second motor, means operable under the control of said indexing means as an incident to such preparatory operation thereof to disengage said locking device from the support, and thereupon to move said main valve into its approach position, and means controlled by said main valve when in such approach position to actuate said second motor to index said support.

7. A machine tool having a reciprocable head, a work support, an hydraulically actuated motor for reciprocating said head, indexing means for said support including a second hydraulically actuated motor, a locking device for said support operable automatically upon the completion of each indexing operation to hold the support against movement, a main control valve having approach and return positions, means under the joint control of said locking device when in its holding position and of said main valve when in its approach position to effect the advance of said head, means operable by said head at the end of its advance movement to move said main valve to its return position whereby to effect the return of said head to its initial position, valve means actuated by said head in its movement into such initial position to effect a preparatory movement of said indexing means by said second motor, means operable under the control of said indexing means as an incident to such preparatory operation thereof to disengage said locking device from the support, means operable under the control of said locking device when disengaged from the support to move said main valve into its approach position, and means controlled by said main valve when in such approach position to actuate said second motor to index said support.

8. A machine tool having a reciprocatory head, a rotatable work support, indexing means for the support, a locking device for said support, hydraulically actuated means connected to said head to reciprocate it, a main control valve adapted to determine the direction of movement of said head by said hydraulic means, means including said main valve for effecting the operation of said support by said indexing means upon the disengagement of said locking device from the support, and means under the joint control of said main valve and of said locking device when in holding relation to the support to effect advance movement of said head by said hydraulically actuated means.

9. A machine tool having a reciprocable head, a rotatable work support, an hydraulically actuated motor for reciprocating said head, indexing means for said support including a second hydraulically actuated motor, a locking device for said support operable automatically upon the completion of each indexing operation to hold the support against movement, a main control valve having approach and return positions, means under the joint control of said locking device when in its holding position and of said main valve when in its approach position to effect the advance of said head, means operable by said head at the end of its advance movement to move said main valve to its return position whereby to effect the return of said head to its initial position, means including an auxiliary valve actuated by said head in its movement into such initial position to effect a preparatory operation of said indexing means by second motor, means operable under the control of said indexing means as an incident to such preparatory operation thereof to disengage said locking device from the support, means movable with said locking plunger and operable when the latter is in its disengaged position to move said main valve into its approach position, and means controlled by said main valve when in such approach position to actuate said second motor to index said support.

10. A machine tool having a reciprocatory head, a rotatable work support, indexing means for the support, a locking device for said support, hydraulically actuated means connected to said head to reciprocate it, a main control valve adapted to determine the direction of movement of said head by said hydraulic means, means including an auxiliary valve actuated by the head to effect a preparatory operation of said indexing means, means including said main valve for effecting the operation of said support by said indexing means upon the disengagement of said locking device from the support, and means under the joint control of said main valve and of said locking device when in holding relation to the support to effect advance movement of said head by said hydraulically actuated means.

In testimony whereof we have hereunto affixed our signatures.

ALBERT M. JOHNSON.
WALTER M. FAIRBAIRN.